United States Patent
Thornton

(10) Patent No.: US 6,796,018 B1
(45) Date of Patent: Sep. 28, 2004

(54) METHOD OF FORMING A SLIDER/SUSPENSION ASSEMBLY

(75) Inventor: Brian Scott Thornton, Santa Clara, CA (US)

(73) Assignee: Western Digital (Fremont), Inc., Fremont, CA (US)

(*) Notice: Subject to any disclaimer, the term of this patent is extended or adjusted under 35 U.S.C. 154(b) by 339 days.

(21) Appl. No.: 10/026,327

(22) Filed: Dec. 21, 2001

(51) Int. Cl.[7] .......................... G11B 5/127; H04R 31/00
(52) U.S. Cl. .............................. 29/603.04; 29/603.07; 29/603.11; 29/603.13; 29/603.15; 29/417; 360/123; 360/126; 360/235.7; 360/236.3; 228/179.1
(58) Field of Search ................ 29/603.04, 603.07, 29/603.11–603.17, 417; 228/179.1; 360/126, 123, 236, 235.7

(56) References Cited

U.S. PATENT DOCUMENTS

| | | | |
|---|---|---|---|
| 4,761,699 A | 8/1988 | Ainslie et al. | 360/234.5 |
| 4,789,914 A | 12/1988 | Ainslie et al. | 360/234.5 |
| 5,126,901 A | 6/1992 | Momoi et al. | 360/234.5 |
| 5,177,860 A * | 1/1993 | Yura et al. | 29/603.07 |
| 5,327,310 A * | 7/1994 | Bischoff et al. | 360/237.1 |
| 5,530,604 A | 6/1996 | Pattanaik | 360/234.5 |
| 5,680,275 A | 10/1997 | Frater et al. | 360/234.5 |
| 5,699,212 A | 12/1997 | Erpelding et al. | 360/245.8 |
| 5,734,524 A * | 3/1998 | Ruiz | 360/234 |
| 5,737,837 A | 4/1998 | Inaba | 29/884 |
| 5,781,379 A | 7/1998 | Erpelding et al. | 360/245.3 |
| 5,815,347 A | 9/1998 | Pattanaik | 360/234.5 |
| 5,821,494 A | 10/1998 | Albrecht et al. | 219/121.64 |
| 5,828,031 A | 10/1998 | Pattanaik | 219/121.63 |
| 5,889,636 A | 3/1999 | Arya et al. | 360/234.5 |
| 5,896,248 A | 4/1999 | Hanrahan et al. | 360/234.5 |
| 6,002,550 A | 12/1999 | Amemiya et al. | 360/234.5 |
| 6,046,882 A | 4/2000 | Pattanaik et al. | 29/878 |
| 6,098,271 A | 8/2000 | Yamamoto et al. | 29/603.06 |
| 6,198,599 B1 | 3/2001 | Senuma | 360/234.5 |
| 6,539,609 B2 * | 4/2003 | Palmer et al. | 29/603.03 |

FOREIGN PATENT DOCUMENTS

JP       54062949 A  *  5/1979

OTHER PUBLICATIONS

"Chip on suspension MR head"; Shiraishi, M.; IEMT/IMC Symposium, 2nd 1998, Apr. 15–17, 1998 pp.: 333–336.*

* cited by examiner

*Primary Examiner*—A. Dexter Tugbang
*Assistant Examiner*—Paul Kim

(57) ABSTRACT

A slider/suspension design and assembly method include securing a slider to a suspension assembly for use in a magnetic disk drive data recording device. To this end, a solder fillet bond is applied at the leading edge surface of the slider to provide a structural connection of the slider to the flexure, while also enabling the slider-suspension assembly to be separated without damage during the process. The slider/suspension assembly is initiated by forming a plurality of sliders on a wafer, in such a manner that the trailing edge surfaces of the sliders form the front side of the wafer, and the leading edge surfaces of the sliders form the backside of the wafer. A plurality of thin film data transducing elements and a plurality of electrical contact pads are then formed on the wafer front side.

7 Claims, 12 Drawing Sheets

METHOD OF FORMING A SLIDER/SUSPENSION ASSEMBLY

CROSS-REFERENCE TO RELATED APPLICATION

This application is related to co-pending U.S. patent application, titled "Flexure Design And Assembly Process For Attachment Of Slider Using Solder And Laser Reflow," which is filed currently herewith, and which is assigned to the same assignee as the present application.

FIELD OF THE INVENTION

The present invention relates in general to data storage systems such as disk drives, and it particularly relates to a slider and a flexure to which the slider is attached. More specifically, the present invention provides a novel flexure design and assembly process for securing the slider to the flexure by means of a solder fillet bond applied to the leading edge surface of the slider, onto the surface of the flexure.

BACKGROUND OF THE INVENTION

In a conventional magnetic storage system, a thin film magnetic head includes an inductive read/write element mounted on a slider. The magnetic head is coupled to a rotary actuator magnet and a voice coil assembly by a suspension and an actuator arm positioned over a surface of a spinning magnetic disk. In operation, a lift force is generated by the aerodynamic interaction between the magnetic head and the spinning magnetic disk. The lift force is opposed by equal and opposite spring forces applied by the suspension such that a predetermined flying height is maintained over a full radial stroke of the rotary actuator assembly above the surface of the spinning magnetic disk.

The suspension assembly includes a resilient load beam, and a flexure to which the slider with a magnetic read/write head is attached. The load beam generally directs the slider toward the air bearing surface (ABS) at a predetermined angle. The aerodynamic force generated by the ABS is reacted by the load beam to maintain the slider over the surface of the spinning magnetic disk at a predetermined flying height.

In a conventional magnetic disk drive, the slider is attached to the flexure by means of an adhesive connection at its interface surface with the flexure. A conventional method of attaching the slider to the suspension that is in common use in the industry typically involves creating a permanent adhesive bond between the slider and the suspension. The method of using an epoxy bonding technique is illustrated in FIG. 6.

A disadvantage of the epoxy bonding method emanates from the permanence of the bond in that any attempt to separate the slider from the suspension would typically necessitate breaking the bond and thus inducing a potential irreversible damage to the suspension-flexure assembly.

Various attempts have been made to alleviate the foregoing concern. Slider-suspension assembly technologies such as solder bumping, under-bump metallization, and flip chip are known in the industry for providing solder bonding process in lieu of epoxy bonding.

One such attempt is exemplified by U.S. Pat. No. 4,761,599 to Ainslie et al. that describes a slider-suspension assembly suitable for mechanically and electrically joining the two components using solder bonding. The bonding method uses simultaneous reflow of all solder bumps, which might necessitate global heating of the entire assembly, including the thin film read/write head.

While conventional methods may have addressed and resolved certain aspects of the foregoing concern, they are not completely satisfactory in that the use of discrete solder contact pads requires masking process steps in manufacturing of slider. In addition, global heating to reflow typical solder alloys could require temperature exposure that is incompatible with the temperature limitation of the read/write head. The need for a comprehensive solution has heretofore remained unsatisfied.

SUMMARY OF THE INVENTION

It is a feature of the present invention to provide a new method for securing a slider to a suspension assembly for use in a magnetic disk drive data recording device. To this end, a solder fillet bond is applied at the leading edge surface of the slider to provide a structural connection of the slider to the flexure, while also enabling the slider-suspension assembly to be separated without damage during the process.

The use of this and other features of the present invention, in conjunction with a thermally processed electrical connection, enables rework of a reject head on a good suspension.

BRIEF DESCRIPTION OF THE DRAWINGS

The features of the present invention and the manner of attaining them, will become apparent, and the invention itself will be understood by reference to the following description and the accompanying drawings, wherein.

Similar numerals in the drawings refer to similar elements. It should be understood that the sizes of the different components in the figures might not be in exact proportion, and are shown for visual clarity and for the purpose of explanation.

DETAILED DESCRIPTION OF PREFERRED EMBODIMENTS

Figure 1:
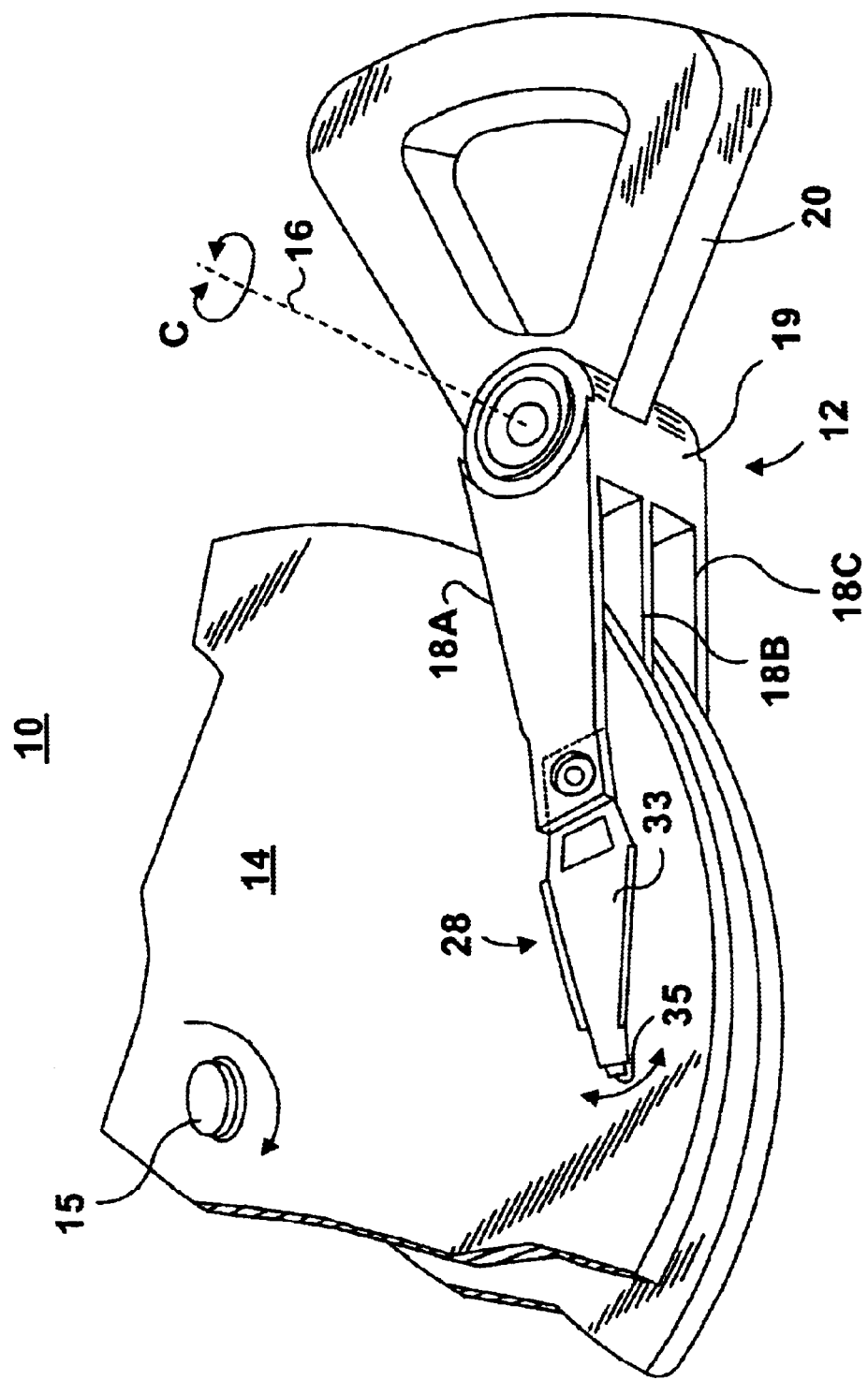
FIG. 1 is a fragmentary perspective view of a data storage system utilizing a read/write head of the present invention.

FIG. 1 illustrates a disk drive 10 comprised of a head stack assembly 12 and a stack of spaced apart magnetic data storage disks or media 14 that are rotatable about a common shaft 15. The head stack assembly 12 is rotatable about an actuator axis 16 in the direction of the arrow C. The head stack assembly 12 includes a number of actuator arms, only three of which 18A, 18B, 18C are illustrated, which extend into spacings between the disks 14.

The head stack assembly 12 further includes an E-shaped block 19 and a magnetic rotor 20 attached to the block 19 in a position diametrically opposite to the actuator arms 18A, 18B, 18C. The rotor 20 cooperates with a stator (not shown) for rotating in an arc about the actuator axis 16. Energizing a coil of the rotor 20 with a direct current in one polarity or the reverse polarity causes the head stack assembly 12, including the actuator arms 18A, 18B, 18C, to rotate about the actuator axis 16 in a direction substantially radial to the disks 14.

Figure 2:
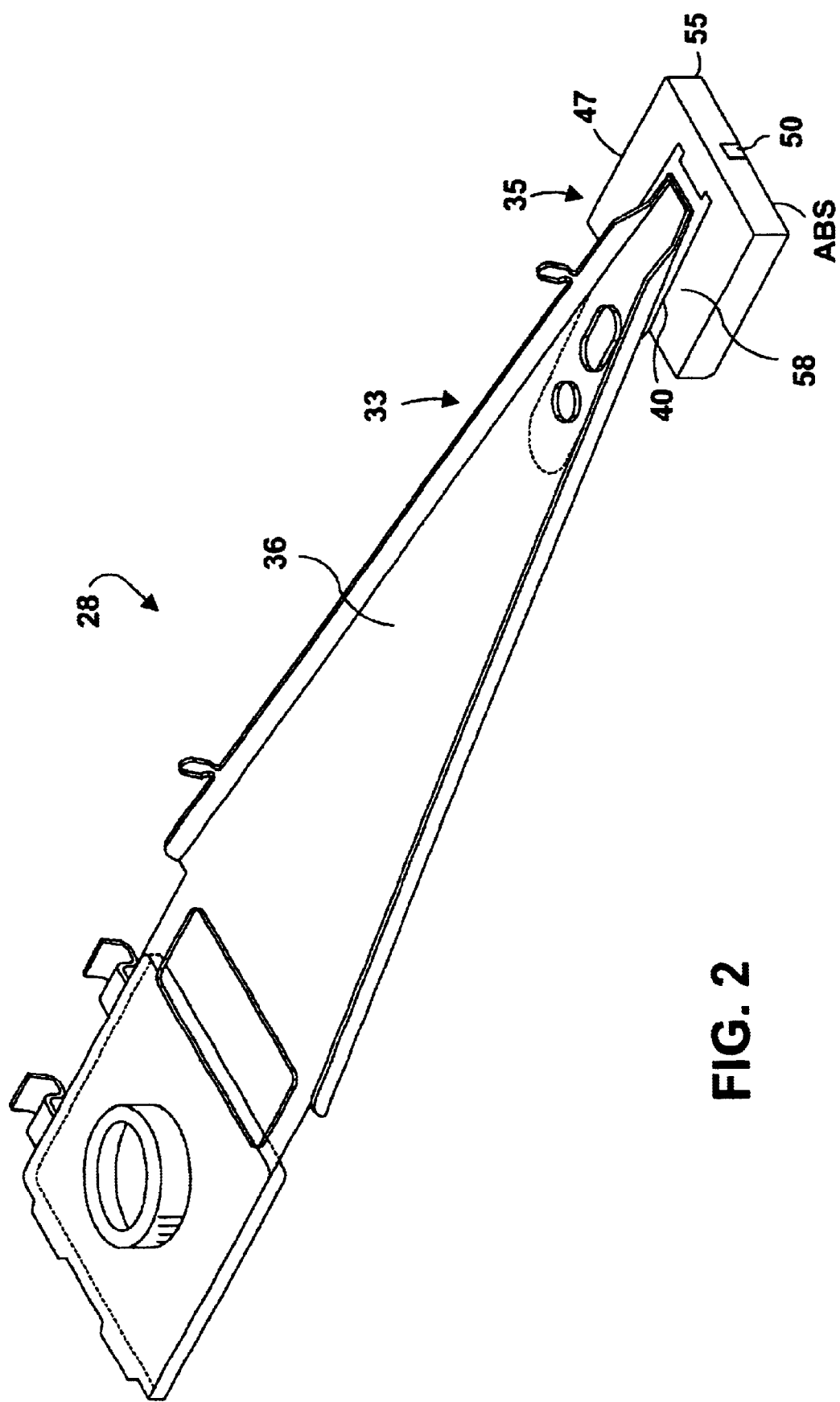
FIG. 2 is a perspective view of a head gimbal assembly (HGA) comprised of a suspension, and a slider to which the read/write head of FIG. 1 is secured, for use in a head stack assembly.

A head gimbal assembly (HGA) 28 is secured to each of the actuator arms, for instance 18A. With reference to FIG. 2, the HGA 28 is comprised of a suspension 33 and a read/write transducer or head 35. The suspension 33 includes a resilient load beam 36 and a flexure 40 to which the head 35 is secured.

The head 35 is formed of a slider 47 secured to the free end of the load beam 36 by means of the flexure 40, and a read/write (or data transducing) element 50 supported by the slider 47. The slider 47 can be any conventional or available slider. The read/write element 50 is mounted at the trailing edge 55 of the slider 47 so that its forwardmost tip is generally flush with the ABS of the slider 47, which is parallel to the surface of the disks 14. The backside 58 of the slider 47, opposite to the ABS, is attached to a tongue 56 of the flexure 40, as illustrated in FIG. 3.

Figure 5:
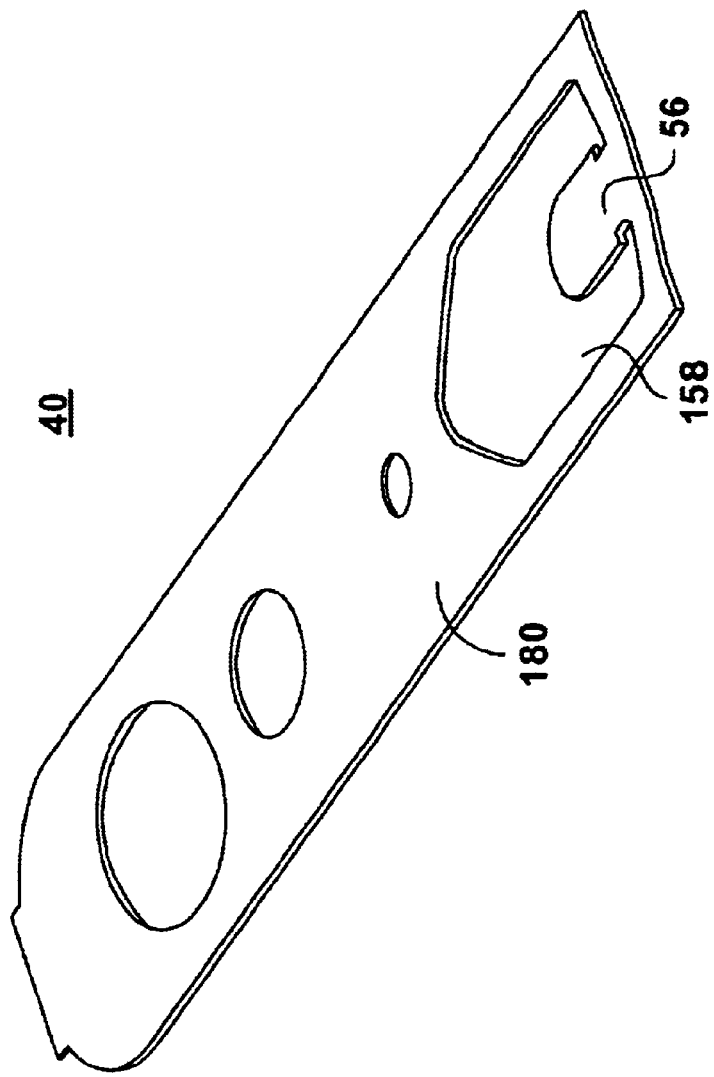
FIG. 5 is an isometric view of a flexure that forms part of the HGA of FIG. 2.

With reference to FIG. 5, the flexure 40 includes a tongue 56 that extends inwardly within a clearance 158 formed in a flexure body 180. As shown in FIG. 3, the flexure 40 provides the slider 47 with sufficient flexibility in various degrees of movement for accommodating the uneven topology of the disk (or data medium) surface and other components and drive assembly tolerances, while the slider 47 is flying over the disk. The flexure 40 is sufficiently stiff in a direction parallel to the disk plane, to resist physical deflection that may be caused by the rapid movement of the actuator arms 18A, 18B, 18C.

The slider 47 is part of the read-write head 35, and is secured to the tongue 56 by means of the technique described herein, which will be described in more detail in connection with FIGS. 8 through 12. A plurality of conductive contact pads 161 are secured to a trailing edge 55 of the slider 47, with only one contact pad 161 being shown in FIG. 3 for the purpose of illustration only. These contact pads 161 are electrically connected to a read/write element 50 by means of conductive traces.

Figure 3:
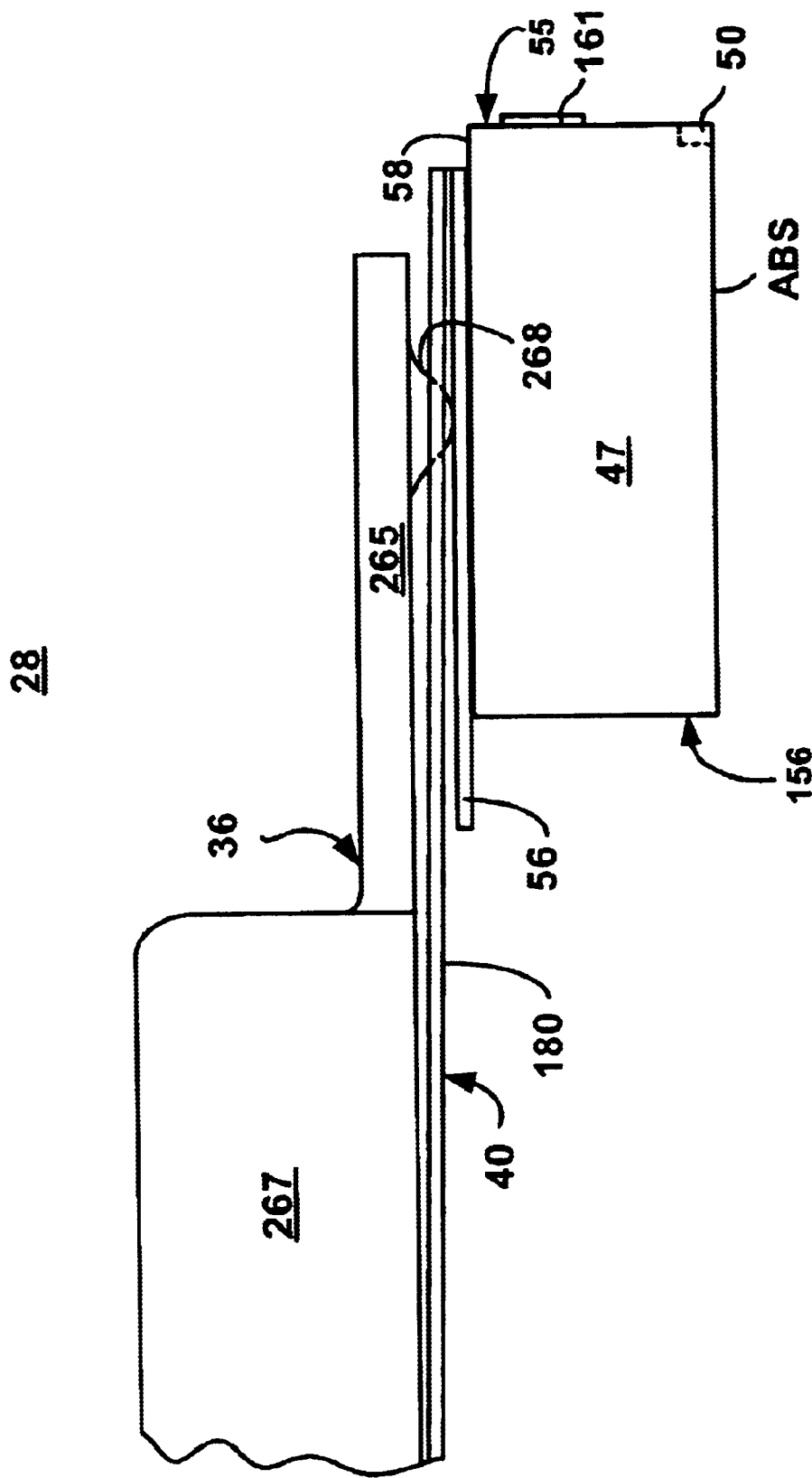
FIG. 3 is an enlarged, fragmentary, side elevational view of the HGA of FIG. 2.
Figure 4:
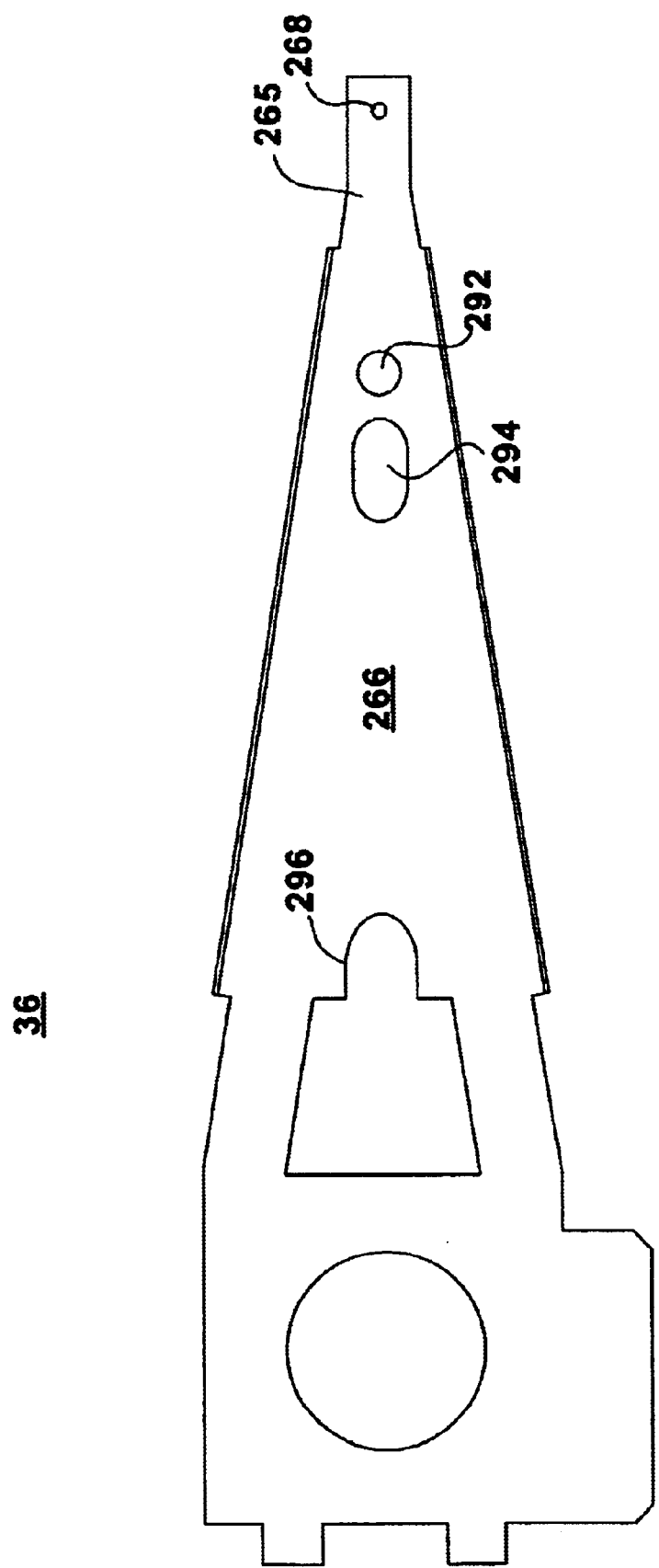
FIG. 4 is a top plan view of a load beam that forms part of the HGA of FIG. 2.

With reference to FIGS. 3 and 4, a dimple 268 is formed in the forward tip 265 the load beam 36, and is urged against the backside of the tongue 56, for contributing to the gimbaling action. Alternatively, the dimple 268 may be formed on the tongue 56, and urged against the underside of the load beam 36.

The load beam tip 265 is positioned above the flexure clearance 158 and at least part of the tongue 56. In one embodiment, the tip 265 extends integrally in a body 266 having two stiffening rails 267 projecting substantially along the length of the body 266. The body 266 includes datum features 292, 294, and 296 (FIG. 4).

Figure 6:
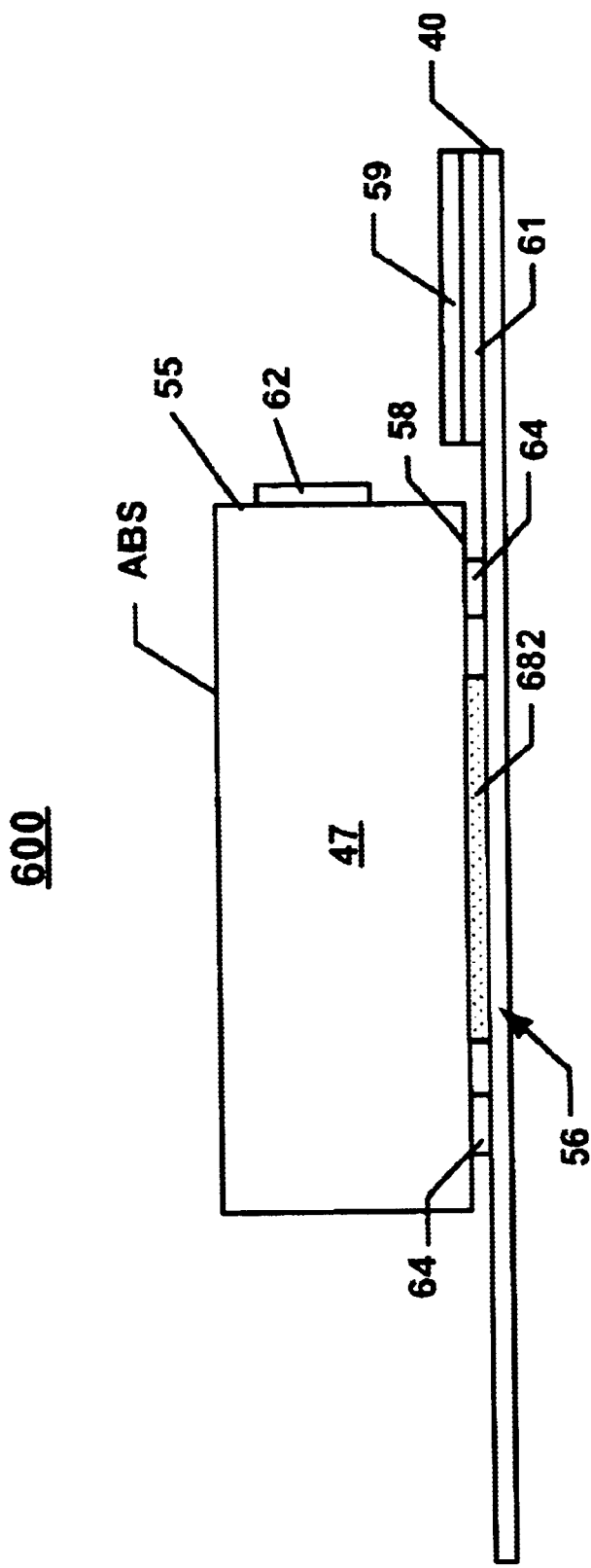
FIG. 6 is an enlarged, side view of a conventional slider/suspension assembly, illustrating the method of epoxy bonding for securing the slider to the suspension.

Referring now to FIG. 6, it illustrates a conventional slider/suspension assembly 600 that is assembled using a known epoxy adhesive bonding process. The backside 58 of the slider 47 is secured to the stainless flexure tongue 56 of the flexure 40 by a thin film of epoxy adhesive layer 682 that is deposited between the slider backside 58 and the flexure tongue 56. The thin film of adhesive layer 682 may be a combination of adhesives each contributing different characteristics to the connection such as mechanical strength or electrical conductivity.

A plurality of dielectric pads 64 are positioned forward and rearward of the slider 47 between the slider backside 58 and the flexure tongue 56. The dielectric pads 64 provide the electrical insulation for the slider 47 from making electrical contacts with the stainless steel flexure tongue 56.

Typically, the epoxy adhesive layer 682 is prepared with a hardener at room temperature. Upon applying the epoxy adhesive to the flexure tongue 56, a curing process at an elevated temperature is carried out by subjecting the slider/suspension assembly 600 to a thermal source, such as in a curing oven. The post-cure epoxy adhesive layer 682 reaches its optimal mechanical strength and provides a rigid mechanical connection of the slider 47 to the flexure 40.

An electrical connection of the slider 47 to the flexure 40 is then made by means of an electrical trace that connects the terminal pad 62 mounted at the trailing edge 55 of the slider 47 to the copper trace layer 59, which rests upon a dielectric layer 61 in turn resting upon the stainless steel flexure tongue 56. Upon curing, the epoxy adhesive layer 682 then becomes permanent and irreversible. In the event that the read/write head 35 should fail any of the inspection criteria, the flexure 40 and possibly the suspension 33, together with the defective read/write head 35 would be discarded.

Figure 7:
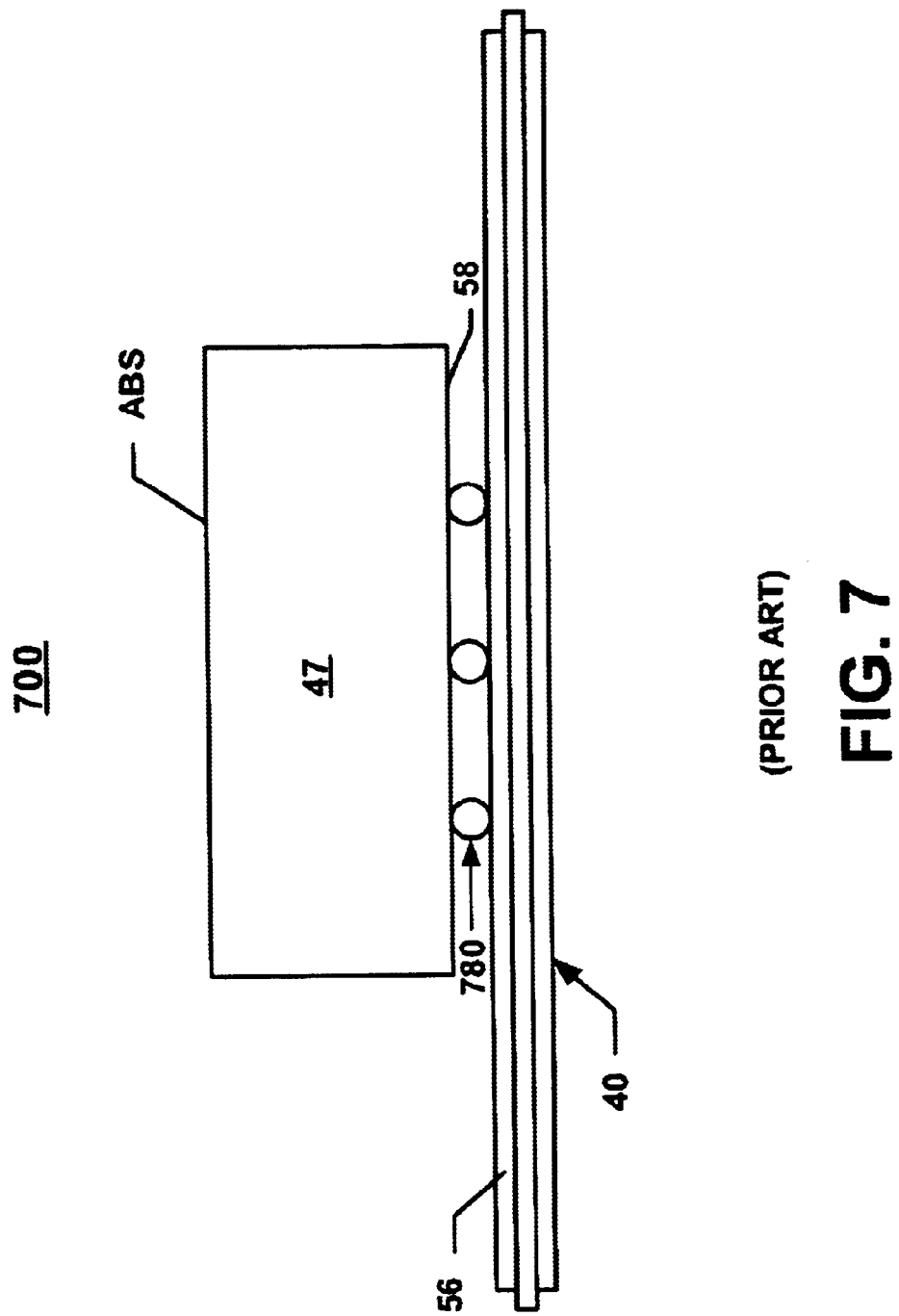
FIG. 7 is an enlarged, side view of another conventional slider/suspension assembly, illustrating the method of solder bonding for securing the slider to the suspension.

FIG. 7 illustrates another conventional slider/suspension assembly 700 that utilizes a conventional solder bonding process. According to this process, a plurality of solder bumps 780 are placed directly between the backside 58 of the slider 47 and the flexure tongue 56. Upon heating, the solder bumps 780 reflow to wet the interface surface between the slider backside 58 and the tongue 56, thereby creating a solid mechanical connection between the slider 47 and the flexure 40.

During the reflow processing of the solder bumps 680, the slider/suspension assembly 700 is usually subjected to heating to an elevated temperature that might be incompatible with the thermal rating of the read/write element 50, thus potentially affecting the performance of the read/write element 50 in an adverse manner. The use of solder bumps 680 on discrete solder pads usually requires an additional masking process in manufacturing the slider, which further increases the manufacturing complexity and cost.

Figure 8:
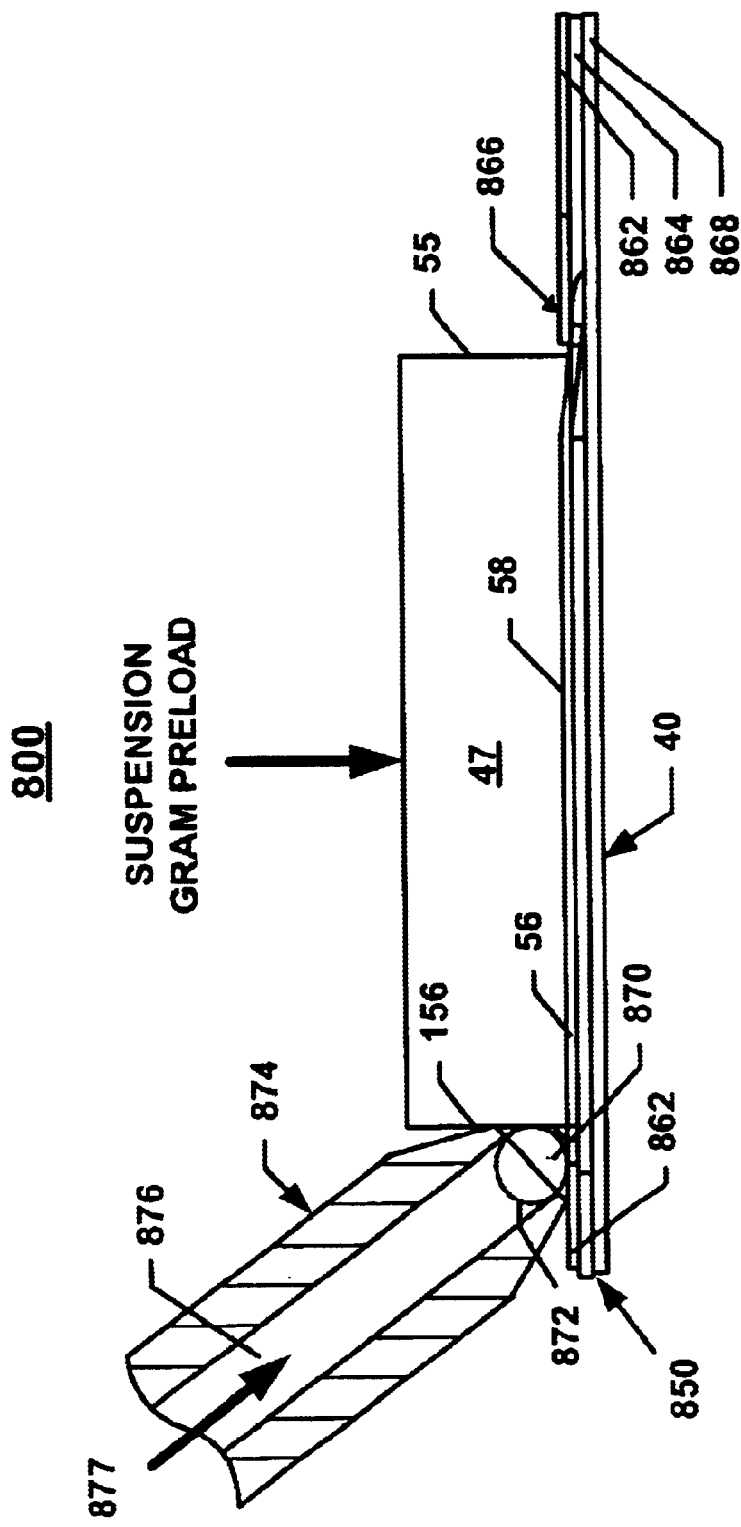
FIG. 8 is an enlarged, partly cross-sectional view of a slider/suspension assembly, illustrating the solder reflow process according to the present invention.
Figure 9:
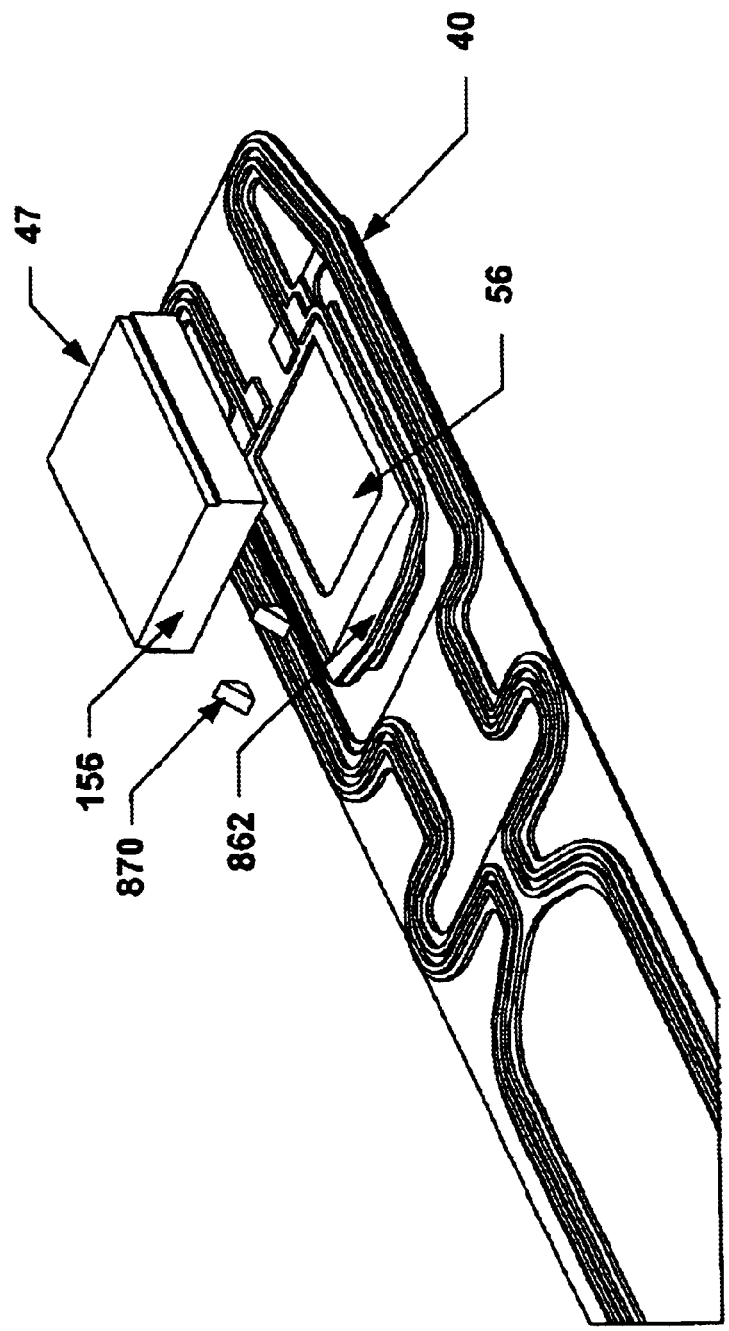
FIG. 9 is an exploded view of a slider-suspension assembly of the present invention.

FIGS. 8 and 9 illustrate a preferred embodiment of the slider/suspension assembly 800 made according to the present invention. The backside 58 of the slider 47 is positioned directly against the tongue 56 of the flexure 40.

In this exemplary embodiment according to FIG. 8, the flexure 40 comprised of a three layer material. The first layer is the metallic bond pad 862 that terminates at the trailing edge of the slider 47. The metallic bond pad 862 is made of a material that is compatible with a fluxless soldering process, and also promotes adhesion of the solder material to the slider/suspension assembly 800. An exemplary material of the metallic bond pad 862 is gold-plated copper.

The second or intermediate layer of the flexure 40 is a polyimide insulator layer 864, which provides electrical insulation of the slider electrical connection to the termination pads 62. The polyimide insulator layer 864 may be applied in a pattern as illustrated in FIG. 9.

The third layer of the flexure 40 is a stainless steel flexure 868 that provides the necessary resiliency to the slider/suspension assembly 800 to withstand the external aerodynamic forces induced in the ABS region while enabling the slider to follow the uneven surface of the disk media.

The slider 47 is positioned onto the flexure 40 with the backside 58 placed in contact with the dielectric layer 864 and the slider leading edge surface 156 adjacent to bond pad 862. The slider 47 is then attached to the flexure 40 by a fillet 870. The fillet connection 870 is made by a solder ball bonding device 874 that places a plurality of solder balls 872 in contact with the two metallized surfaces formed by the slider leading edge surface 156 and the flexure bond pad 862. An exemplary solder ball material may be a eutectic tin lead alloy.

During the application of solder ball bonding process, the slider 47 is loaded into a fixture and clamped in place. While loading the suspension 33 into the fixture, an arm is positioned to prevent contact between the suspension flexure 40 and the slider 47. Once the suspension 33 is clamped in place at the suspension baseplate, the arm is lowered so that the flexure tongue 56 comes in contact with the slider 47, thereby applying the gram preload to the slider 47.

A capillary tube 876 of a solder ball bonding device 874 is positioned adjacent to the bond pad and the metalized leading surface of the slider 47. A solder ball 872 is dropped into position at the opening of the capillary tube 876, in contact with the bond pad and the slider surfaces. Laser energy 877 is delivered to the solder ball 872 through a capillary tube 876 of the solder ball bonding device 874. The laser energy 877 melts the solder ball 872, causing it to wet the slider leading edge surface 156 and the flexure bond pad 862, and creating a fillet 870. Upon cooling, the solder fillet 870 forms a solid mechanical connection between the slider leading edge surface 156 and the flexure bond pad 862.

As the solder balls 872 become liquefied, the suspension gram preload continues to push the flexure 40 toward the back side 58 of the slider 47. Upon solidification of the fillet 870, the suspension gram preload is removed.

After forming the mechanical fillet connection 870 between the slider 47 and the flexure 40 at the leading edge surface 156, the electrical connections between the slider electrical pads and the flexure circuit termination pads could be made by any of a number of methods, preferably by the same solder ball bonding process described earlier to form the fillet 870.

In the design of the magnetic read/write head 35, careful consideration is given to the electrical grounding of the slider 47. This electrical grounding is necessary to prevent the buildup of static charges that could discharge to the surface of the data medium through the transducer poles from the transducer pole to the data medium. Such a discharge could result in the failure of the read/write head 35 and loss of data stored on the recording medium of the data medium.

To address this potentially serious issue, reference is made to FIG. 8 and further to FIG. 9, which illustrates a preferred embodiment of the present invention incorporating a grounding path that is achieved by connecting the bond pad layer 862 to the stainless steel layer 868 (FIG. 8) of the flexure 40 with an electrically conductive adhesive. By applying a conductive adhesive between the bond pad layer 862 and the stainless steel flexure 868, a grounding path between the slider 47 and the flexure 40 is established, thereby preventing a harmful discharge of static electricity.

The advantage of using solder bonding for attaching the slider 47 to the flexure 40 is afforded by the ability to reflow the solder fillet 870 as shown in FIG. 8. The use of solder ball 872 allows for the removal of the read/write head 35 while the solder fillet 870 is molten, in the event that the read/write head 35 fails any of several inspection criteria. The suspension 33 can then be prepared to accept another head through the same or similar solder ball bonding process. A large portion of the suspension 33 cost is thus saved through the suspension recovery and reuse, hence providing a substantial economic advantage. Furthermore, the application of laser energy 877 at the leading edge surface 156 as shown in FIG. 8 ensures that the local heating would not adversely affect the thermal compatibility of the read/write element 50.

Other advantages of the present invention as compared to metallizing the backside 58 of the slider 47 include the placement of the metallization process in the manufacturing flow, and the absence of solder bumps on the metallized surface of the backside 58.

Figure 10:
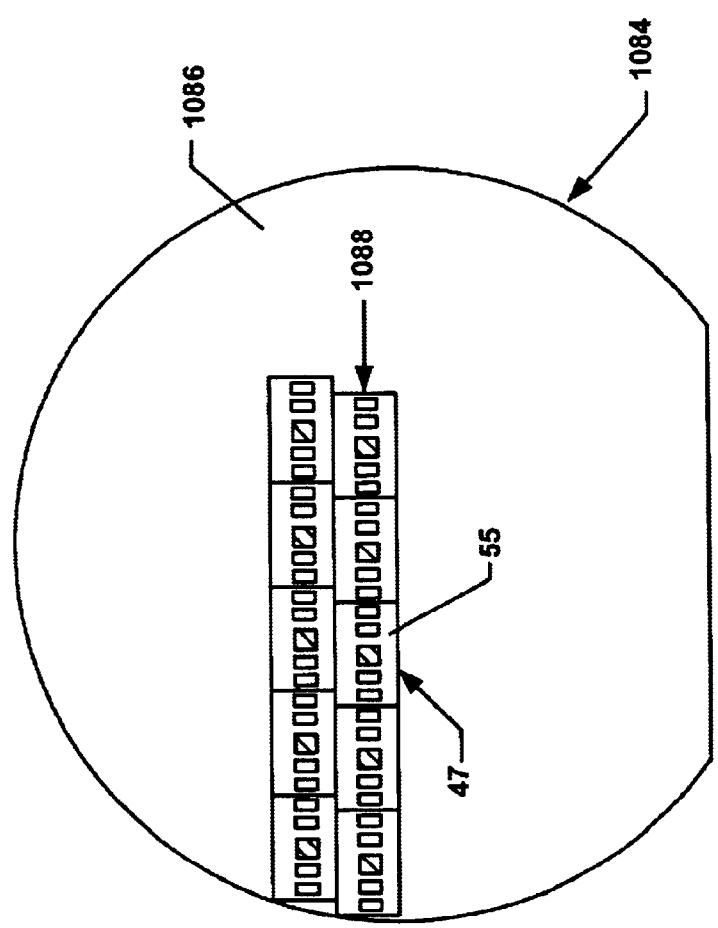
FIG. 10 is a top plan view of a wafer, illustrating the metallization process of the slider at the wafer level, according to the present invention.

Referring now to FIG. 10, the trailing edge surface 55 of the slider 47 corresponds to the front side 1086 of the wafer 1084, which is also the surface upon which the thin film read/write elements 50 are formed. The wafer 1084 is comprised of a plurality of slider bars 1088 adjoining one another lengthwise.

Figure 11:
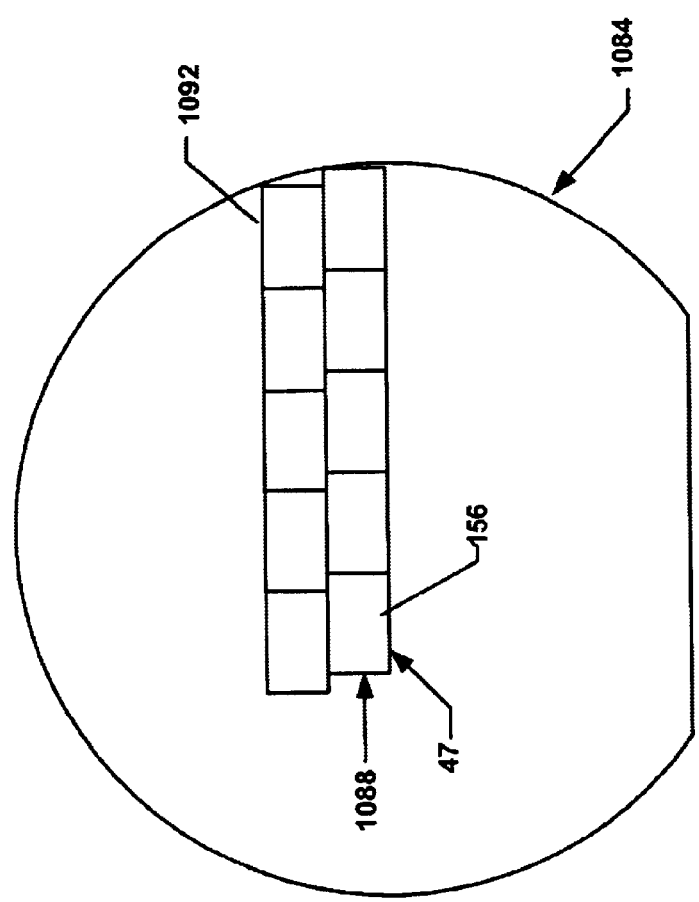
FIG. 11 is a bottom plan view of the wafer of FIG. 10, illustrating the metallization process of the slider at the wafer level, according to the present invention.
Figure 12:
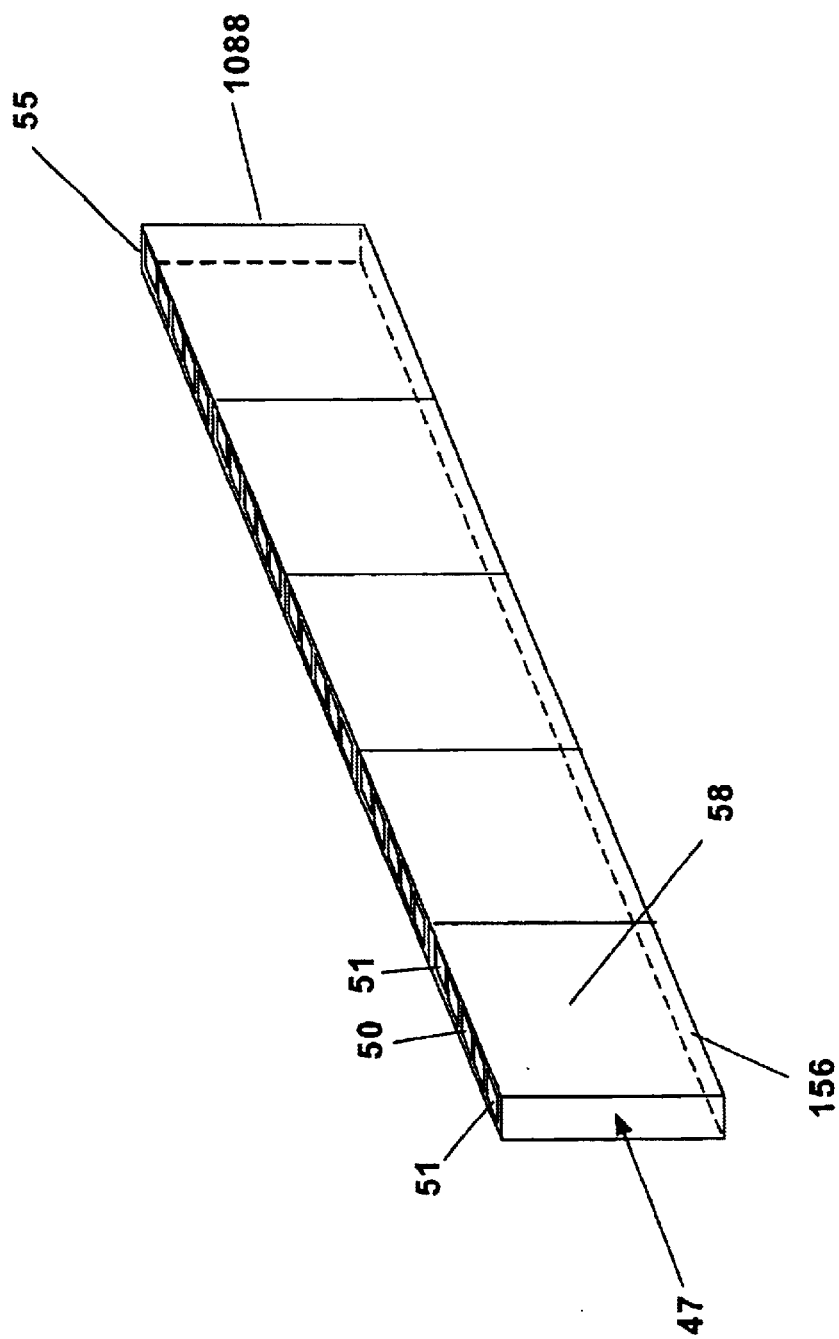
FIG. 12 is a perspective view of a slider bar that has been diced from the wafer of FIGS. 10 and 11.

With further reference to FIGS. 11 and 12, each slider bar 1088 is comprised of a plurality of sliders 47 that are positioned adjacent to one another on their sides, in such a manner that their trailing edge surfaces 55 form the front side 1086 of the wafer 1084 and their leading edge surfaces 156 form the back side 1092 of the wafer 1084. A thin film read/write element 50 together with a plurality of electrical contact pads 51 are initially formed at the wafer 1084 level on the front side 1086.

The read/write element 55 is positioned in the center of the trailing edge surface 55 of the slider 47. Two electrical contact pads 51 are placed on either side of the read/write element 55 (FIG. 12). Upon the formation of the read/write elements 55 and the electrical contact pads 51 on the trailing edge surfaces 55 of the sliders 47 at the wafer 1084 level, the back side 1092 of the wafer 1084 (FIG. 11) corresponding to the slider leading edge surfaces 156 undergoes a metallization process.

The metallization step is comprised of three layers of material deposited onto the back side 1090 of the wafer 1084, namely; a metal adhesion layer, a wetting layer, and a corrosion resistance layer. The metal adhesion layer is generally constituted of chromium or titanium, which promotes the adhesion of the solder material. The wetting layer is typically made of copper and is placed between the metal adhesion layer and the corrosion resistance layer.

The corrosion resistance layer is made of gold plated material which is known to be chemically inert. The copper wetting layer protects the gold corrosion resistance layer from fusing into the metal adhesion layer, which may otherwise result in a brittle failure of the gold corrosion protection layer.

After the metallization step at the wafer 1084 level is complete, the slider bars 1088 are diced from the wafer 1084. The slider bars 1088 then further undergo a dicing process to form sliders 47.

Each of the sliders 47 is then placed onto the suspension flexure 40 for subsequent bonding processing in accordance with the method of solder ball slider leading edge fillet bonding process of the present invention as described earlier.

In contrast with the conventional design of FIG. 7 that requires metallizing the sliders 47 at the slider bar 1088 level, the metallization of the leading edge surfaces 156 of the sliders 47 at the wafer 1084 of the present invention results in a more efficient manufacturing process by eliminating several manufacturing steps associated with the metallization of the sliders 47 at the slider bar 1088 level. Furthermore, the absence of solder bumps on the metallized surface of the slider backside 58 substantially simplifies the handling process, which would otherwise require special tooling to allow for the solder bumps on the slider 47 as illustrated in the conventional design of FIG. 7.

It should be understood that the geometry, compositions, and dimensions of the elements described herein can be modified within the scope of the invention and are not intended to be the exclusive; rather, they can be modified within the scope of the invention. Other modifications can be made when implementing the invention for a particular application or environment.

What is claimed is:

1. A method of forming a slider/suspension assembly for use in a data storage system, comprising:

forming a plurality of adjacently disposed sliders on a wafer, wherein the sliders are positioned in such a manner that trailing edge surfaces of the sliders form a front side of the wafer, and leading edge surfaces of the sliders form a backside of the wafer;

forming a plurality of thin film data transducing elements and a plurality of electrical contact pads on the wafer front side;

metallizing the backside of the wafer so as to metallize the sliders leading edge surfaces while the sliders are on the wafer;

dicing the wafer into a plurality of individual sliders;

positioning a backside of each of a plurality of sliders directly against a corresponding flexure; and applying a solder fillet bond to a leading edge surface of each of the plurality of sliders, wherein the solder filler flows between the slider leading edge surface and the flexure when heated to form a rigid mechanical connection of the slider to the flexure, while enabling the slider to be separated from the flexure on demand.

2. The method of claim 1, further including forming the flexure of a plurality of overstacked layers.

3. The method of claim 2, wherein forming the flexure includes forming a metallic bond pad as a first layer made of a material that is compatible with a fluxless solder process.

4. The method of claim 3, wherein forming the metallic bond pad includes forming a gold-plated copper layer.

5. The method of claim 3, wherein forming the flexure further includes forming a second layer and a third layer.

6. The method of claim 5, wherein forming the second layer of the flexure includes forming a polyimide insulator layer that provides electrical insulation between the first layer and the third layer.

7. The method of claim 6, wherein forming the third layer of the flexure includes forming a stainless steel flexure tongue that provides resiliency.

* * * * *